United States Patent
Molina-Markham et al.

(10) Patent No.: US 10,063,562 B1
(45) Date of Patent: Aug. 28, 2018

(54) FLEXIBLE ACCESS MANAGEMENT FRAMEWORK BASED ON MEASURING APPLICATION USAGE BEHAVIOR

(71) Applicant: EMC Corporation, Hopkinton, MA (US)

(72) Inventors: Andres D. Molina-Markham, Woburn, MA (US); Alina Oprea, Arlington, MA (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 15/086,522

(22) Filed: Mar. 31, 2016

(51) Int. Cl.
*H04L 29/00* (2006.01)
*H04L 29/06* (2006.01)

(52) U.S. Cl.
CPC .......... *H04L 63/105* (2013.01); *H04L 63/083* (2013.01)

(58) Field of Classification Search
CPC . H04L 63/105; H04L 63/083; H04L 63/0807; H04L 63/0853; H04L 63/20; H04L 63/08; H04L 9/3234; G06F 21/105; G06F 21/121; G06F 21/31; G06F 21/34; G06F 21/35; H04W 12/06; H04W 12/08; H04M 1/7253
See application file for complete search history.

(56) References Cited

U.S. PATENT DOCUMENTS

| | | | | |
|---|---|---|---|---|
| 8,272,033 | B2* | 9/2012 | Wasmund | G06F 21/316 726/2 |
| 9,160,726 | B1 | 10/2015 | Kaufman et al. | |
| 9,163,962 | B2* | 10/2015 | Ainsworth | G01D 9/005 |
| 9,185,101 | B2* | 11/2015 | Grigg | H04L 63/08 |
| 9,275,211 | B2* | 3/2016 | Stubblefield | H04L 63/0853 |
| 9,305,151 | B1 | 4/2016 | Dotan et al. | |
| 9,305,298 | B2* | 4/2016 | Wilson | G06Q 20/42 |
| 9,325,719 | B2 | 4/2016 | Lloyd | |
| 9,331,994 | B2 | 5/2016 | Grigg et al. | |
| 9,342,677 | B2 | 5/2016 | Ali et al. | |
| 9,572,036 | B2* | 2/2017 | Meredith | H04W 12/12 |
| 2008/0092209 | A1* | 4/2008 | Davis | G06F 21/316 726/2 |

(Continued)

*Primary Examiner* — Don Gordon Zhao
(74) *Attorney, Agent, or Firm* — BainwoodHuang

(57) ABSTRACT

Techniques of controlling access to a resource involve selecting an authentication scheme for authenticating a user based on an environmental context in which the user is requesting access to the resource. Along these lines, the access control server receives application usage data from a user and separates the data into current environmental factors and current usage factors. In response, the access control server compares the current environmental factors to expected environmental factors for each of multiple predefined environmental contexts. Based on measures of closeness between the current and expected environmental factors, the access control server computes a familiarity score indicative of whether the request to access the resource is recognizable within the particular environmental context. The access control server then selects, based on the familiarity score, an authentication scheme from a choice of multiple such schemes by which to authenticate the user before granting the user access to the resource.

21 Claims, 5 Drawing Sheets

(56) References Cited

U.S. PATENT DOCUMENTS

| | | | |
|---|---|---|---|
| 2008/0155651 A1* | 6/2008 | Wasmund | G06F 21/316 |
| | | | 726/2 |
| 2009/0249443 A1* | 10/2009 | Fitzgerald | H04L 63/10 |
| | | | 726/2 |
| 2012/0180124 A1* | 7/2012 | Dallas | G06F 21/46 |
| | | | 726/22 |
| 2014/0289821 A1* | 9/2014 | Wilson | G06Q 20/42 |
| | | | 726/5 |
| 2014/0289833 A1* | 9/2014 | Briceno | H04L 63/08 |
| | | | 726/7 |
| 2015/0229624 A1* | 8/2015 | Grigg | H04L 63/08 |
| | | | 726/7 |
| 2016/0127342 A1* | 5/2016 | Weerasuriya | H04L 63/08 |
| | | | 726/7 |
| 2016/0150413 A1* | 5/2016 | Meredith | H04W 12/12 |
| | | | 455/410 |
| 2016/0285855 A1* | 9/2016 | Stubblefield | H04L 63/0853 |
| 2017/0171216 A1* | 6/2017 | Chhabra | H04L 63/105 |

* cited by examiner

US 10,063,562 B1

FLEXIBLE ACCESS MANAGEMENT FRAMEWORK BASED ON MEASURING APPLICATION USAGE BEHAVIOR

BACKGROUND

Conventional access control systems protect sensitive resources by performing authentication operations to determine whether users requesting access to the resources are authentic. In one example, a user may be required to provide a correct password before being granted access to a resource. In another example, the user may be asked to provide a recognized fingerprint to a fingerprint reader before being granted access to a resource. For these examples, a conventional access control system compares the provided user input to expected user input to determine whether to grant or deny the user access to the sensitive resource.

SUMMARY

Improved techniques of controlling access to a resource involve selecting an authentication scheme for authenticating a user based on an environmental context in which the user is requesting access to the resource. Along these lines, the access control server receives application usage data from a user and separates the data into current environmental factors and current usage factors. In response, the access control server compares the current environmental factors to expected environmental factors for each of multiple predefined environmental contexts. Based on measures of closeness between the current and expected environmental factors, the access control server computes a familiarity score indicative of whether the request to access the resource is recognizable within the particular environmental context. The access control server then selects, based on the familiarity score, an authentication scheme from a choice of multiple such schemes by which to authenticate the user before granting the user access to the resource.

Advantageously, the improved techniques provide an intelligent framework for automatically deciding how authentication operations should be carried out. Continuing the email example above, rather than requiring the user first enter a password and then requiring the user answer a challenge question, the improved techniques, upon evaluating the current environment in which the user is requesting access to the resource, requires some other authentication scheme more appropriate to the environment.

One embodiment is directed to a method of controlling access to a resource. The method includes receiving, by processing circuitry, a stream of usage data from a user device, the stream of usage data including (i) current environmental factors and (ii) current application usage factors, the current environmental factors describing a current environment in which a user is using an application on the user device to request access to a resource, the current application usage factors describing a current application usage behavior exhibited by the user in the current environment. The method also includes generating, by the processing circuitry, a familiarity score based on the current environmental factors and the current application usage factors, the familiarity score indicating whether the current application usage behavior exhibited by the user in the current environment is anomalous. The method further includes selecting, by the processing circuitry, an authentication scheme from multiple selectable authentication schemes by which to authenticate the user before granting the user access to the resource, the authentication scheme being selected based on the familiarity score and the resource.

Additionally, some embodiments are directed to a system constructed and arranged to control access to a resource. The system includes memory and controlling circuitry constructed and arranged to carry out a method of controlling access to a resource.

Further, some embodiments are directed to a computer program product having a non-transitory computer readable storage medium that stores instructions which, when executed by a computer, cause the computer to carry out the method of controlling access to a resource.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of controlling access to a resource involve selecting an authentication scheme for authenticating a user based on an environmental context in which the user is requesting access to the resource. Advantageously, the improved techniques provide an intelligent framework for automatically deciding how authentication operations should be carried out.

Figure 1:
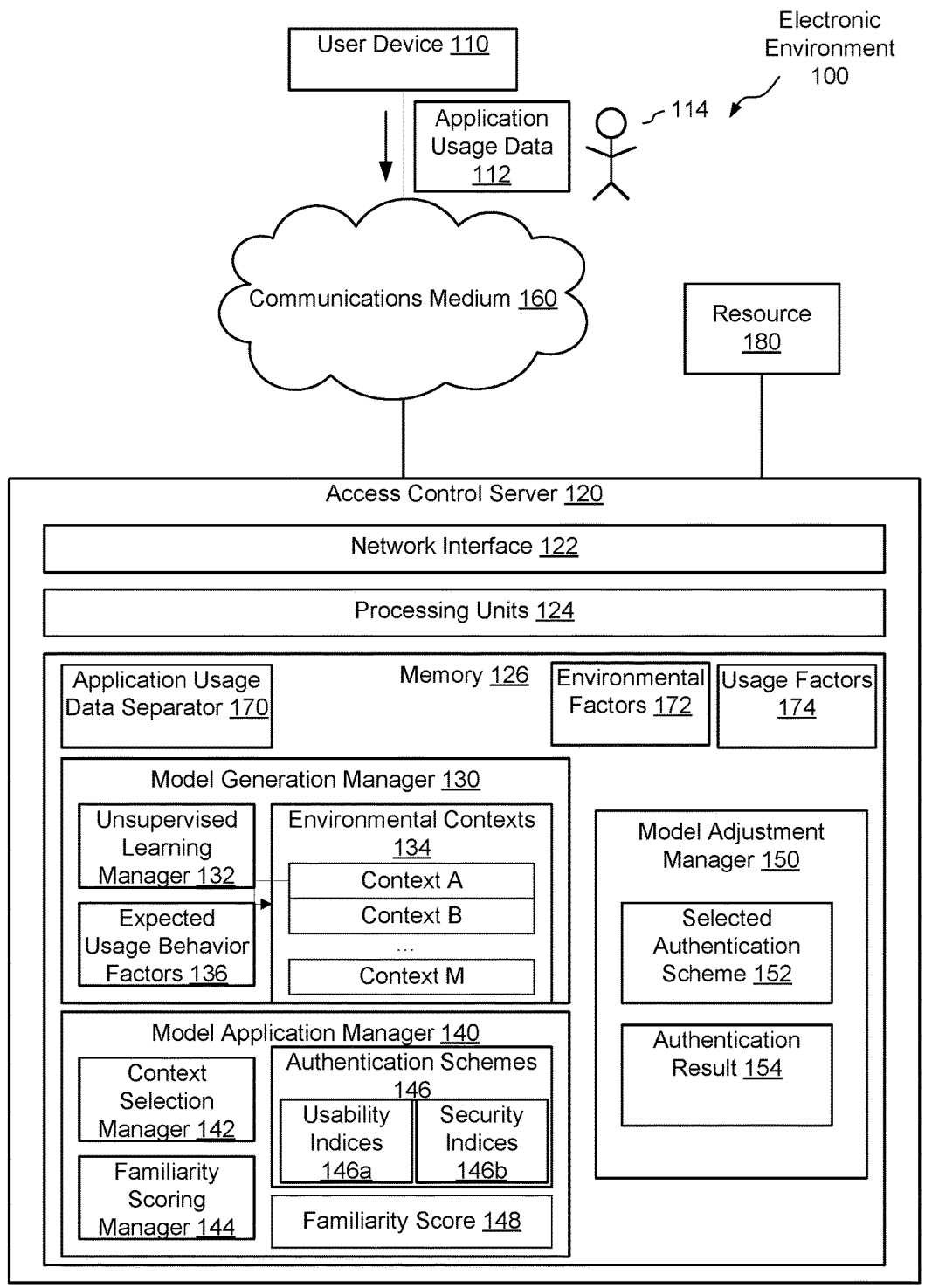
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes a user device 110, an access control server 120, and an electronic network 160.

The user device 110 is configured to run applications that request access to the resource 180 via electronic network 160 and send application usage data 112 to the access control server 120. Typically, the user device 110 is a mobile device such as a smartphone, PDA, or tablet computer. However, in some arrangements, the user device 110 may be a desktop or laptop computer. For example, user 114 on the user device 110, e.g., a smartphone, may operate an email program in the process of requesting access to a confidential document. While the user 114 is operating the email program on the smartphone 110, the smartphone may send application usage data 112 to the access control server 120.

The application usage data 112 includes environmental factors 172 and application usage factors 174. The environmental factors 172 describe the environment in which the user 114 is operating an application on the user device 110. Examples of the environmental factors 172 include the following:
- Time (e.g., minute of the day, week/weekend day)
- Location (e.g., latitude, longitude, GPS coordinates, speed)
- Cell/Wifi signal (Number of base stations, number of trusted base stations, number of most frequent base stations, churn)
- Bluetooth signal (number of devices nearby, number of most frequent devices, churn)
- Activity level
- Temperature
- Light Examples of the application usage factors 174 include the following:
- Duration of session on user device 110
- Number of sessions in last interval of N minutes
- Occurrence of top M applications
- Occurrence of top K pairs of applications
- Number of applications in the session
- Duration of each application in the session
- Motion during the session
- Date of last application update It should be understood that the environmental factors 172 and the application usage factors 174 are treated separately by the access control server 120 in order to perform a familiarity score computation.

The communications medium 160 provides network connections between the access control server 120 and the user device 110. The electronic network 160 may implement any of a variety of protocols and topologies that are in common use for communications over the Internet or other networks. Further, the electronic network 160 may include various components (e.g., cables, switches/routers, gateways/bridges, etc.) that are used in such communications.

The access control server 120 is configured to control access to the resource 180 by (i) generating a set of model environmental contexts 134 based on training data sent from the user device 110 and (ii) applying the model environmental contexts 134 to received application usage data 112 to select an authentication scheme 146 for authenticating the user 114. It should be understood that one possible authentication scheme 110 is no authentication operation. As illustrated in FIG. 1, the access control server 120 is implemented as a computer system that is in communication with the user device 110 over the electronic network 160.

The access control server 120 is seen to include one or more network interfaces 122, a set of processing units 124, and memory 126. The network interfaces 122 include, for example, Ethernet adapters, Token Ring adapters, and the like, for converting electronic and/or optical signals received from the electronic network 160 to electronic form for use by the UBA server 120. The set of processing units 124 include one or more processing chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as a model generation manager 130, a model application manager 140, a model adjustment manager 150, and an application data separator 170. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example. The memory 126 is also constructed and arranged to store various data.

The model generation manager 130 is a software construct configured to take as input training data received over a period of time and derive environmental contexts 134 as well as expected application usage behavior 136 in each of the environmental contexts 134. To accomplish this, the model generation manager 130 includes an unsupervised learning manager 132 that performs the learning necessary to define the contexts 134 and the expected usage 136.

The unsupervised learning manager 132 is a software construct that uses an unsupervised learning algorithm to discover the environmental contexts 134, e.g., Context A, Context B, . . . , Context M. It should be understood that each of the environmental contexts 134 corresponds to an expected set of environmental factors resulting from the training data. Further, the expected application usage behavior 136 includes sets of application usage factors such that each set of application usage factors corresponds to a respective environmental context 134.

The model application manager 140 is a software construct configured to apply the environmental contexts 134 and expected application usage behavior 136 to current environmental factors 172 and application usage factors 174 in order to determine the best authentication scheme 146 for the user 114. The model application 140 includes other software constructs such as a context selection manager 142 and a familiarity scoring manager 144, as well as a list of authentication schemes 146 and a familiarity score 148 from which an authentication scheme is selected.

The context selection manager 142 is a software construct configured to provide a measure of closeness between the current environmental factors 172 and the expected environmental factors of each of the environmental contexts 134. In some arrangements, the measure of closeness is a deviation from an expected environmental factor. Such a deviation may take the form of a probability factor indicating a probability that the current environmental factors describes expected environmental factors of the specific environmental context.

The familiarity scoring manager 144 is a software construct configured to generate a familiarity score 148 from the closeness measures output by the context selection manager 142, the application usage factors 174, and the expected usage behavior factors 136. In some arrangements, the familiarity score 148 is generated by the familiarity scoring manager using specific probability distribution functions derived by the model generation manager during the learning process described above.

The authentication schemes 146 are data describing various authentication techniques, along with measures of their usability and security. These measures are encapsulated in the usability indices 146a and security indices 146b. Examples of the authentication schemes 146 and their indices are as follows in Table 1:

TABLE 1

| Authentication Scheme Identifier | Usability Index | Security Index |
| --- | --- | --- |
| None | 10 | 1 |
| Fingerprint Reader | 6 | 7 |
| Password | 2 | 7 |
| Password and HW Token | 1 | 9 |

Note that, in this example, the usuability and security indices are numbers between 1 and 10. These numbers are determined from the familiarity score 148.

The model adjustment manager 150 is a software construct configured to adjust the environmental contexts 134 and the expected usage behavior factors 136 based on the application usage data 112, a selected authentication scheme 152, and an authentication result 154.

The application usage data separator 170 is a software construct configured to separate the application usage data 112 into the environmental factors 172 and the application usage factors 174. The separator 170 performs a separation through an identification process: each factor in the application usage data carries an identifier and the separator 170 operates on such an identifier.

During example operation, in a training phase, the user device 110 sends training data in the form of typical application usage data 112 generated by an application running on the user device 110 and operated by the user 114. For example, the training phase might be a 30-day period in which the model generation manager 130 takes in data 112 without attempting to authenticate the user 114, i.e., assuming that the user 114 is indeed authentic. Further details concerning the training phase are described with regard to FIG. 2.

Figure 2:
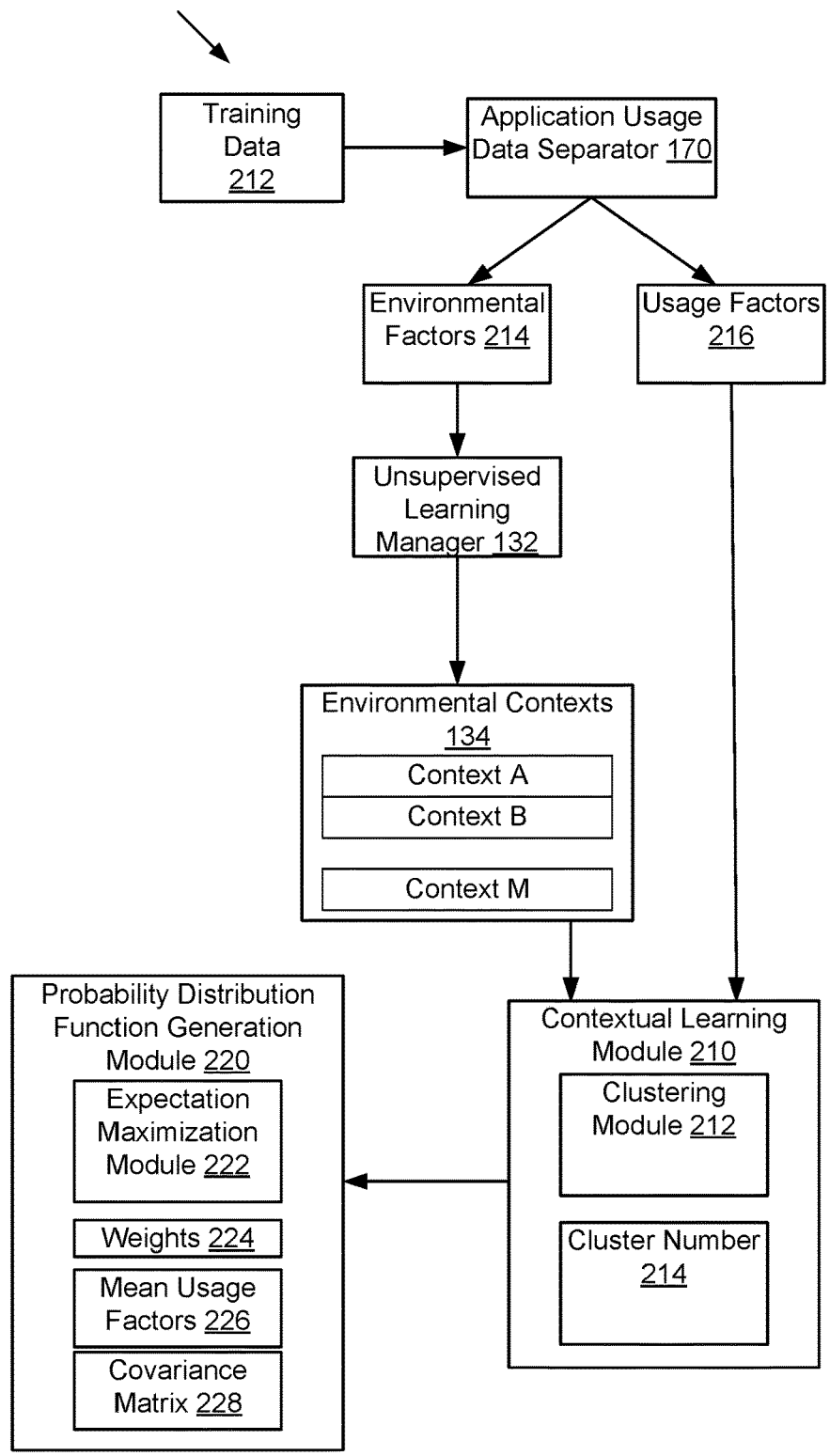
FIG. 2 is a flow chart illustrating an example model generation within the electronic environment shown in FIG. 1.

FIG. 2 illustrates an example model generation manager 130. As shown in FIG. 2, when the access control server 120 receives training data 212 in steams received over time, the application usage data separator 170 produces separate environmental factors 214 and usage factor 216. We denote here the environmental factors generally by $Y = \{Y_1, Y_2, \ldots, Y_m\}$ and the usage factors generally by $X = \{X_1, X_2, \ldots, X_d\}$. That is, there are m environmental factors and d usage factors under consideration.

The model generation manager 130 inputs the environmental factors 214 into the unsupervised learning manager 132 and generates a relatively small number of contexts 134 $C_j = \{y_1, y_2, \ldots, y_m\}$, where the small letters $y_k$ denote possible values of the factors $Y_k$. For example, one context $C_1$ might describe an environment in an office during the workweek, while another context $C_2$ might describe an environment at home during the weekend. The model generation manager 130 may also compute probabilities of each context.

The model generation manager 130 then uses the derived contexts 134 and usage factors 216 to derive an estimate of the probability that the usage factors take on values of usage factors 216 $\{x_1, x_2, \ldots, x_m\}$ given a particular context 134, or $\Pr(X_1 = x_1, X_2 = x_2, \ldots, X_d = x_d | C_j)$. The model generation manager estimates these probabilities by assuming a particular functional form of the probability distribution function $$p(x \mid C) = \sum_{k=1}^{K} \pi_k N\left(x, \mu_k, \sum_k\right)$$

where $\mathcal{N}$ is a normal distribution, $\pi_k$ is a weight, $\mu_k$ is a vector of mean values of the application usage factors, and $\Sigma_k$ is a covariance matrix for that context. These parameters so far are unknown.

To determine the probability distribution function for each context 134, the model generation manager 130 inputs the contexts 134 and the usage factors 216 into a contextual learning module 210. The contextual learning module 210 is a software construct configured to determine the cluster number K 214 of normal distributions in the probability distribution and includes a clustering module 212. The clustering module 212 determines the cluster number 214 by performing a cluster analysis on the usage factors 216.

The contextual learning module 210 then inputs the cluster number 214 as well as the usage factors 216 in each cluster into a probability distribution function generation module 220. The probability distribution function generation module 220 is a software construct that determines the values of the parameters $\pi_k$, $\mu_k$, and $\Sigma_k$ for each normal distribution, $k \in \{1, 2, \ldots, K\}$. The probability distribution function generation module 220 includes an Expectation Maximization Module 222 which uses an expectation-maximization (EM) algorithm to determine the values of the weights $\pi_k$ (224), the mean usage factors $\mu_k$(226), and covariance matrix $\Sigma_k$ (228) for each normal distribution. As the EM algorithm is well known in the art, it will not be discussed further here.

To summarize, the model generation manager 130 has defined each context 134 and has associated a probability distribution with that context. In this way, the model generation manager 130 can define a measure of closeness as a value of the probability distribution.

Figure 3:
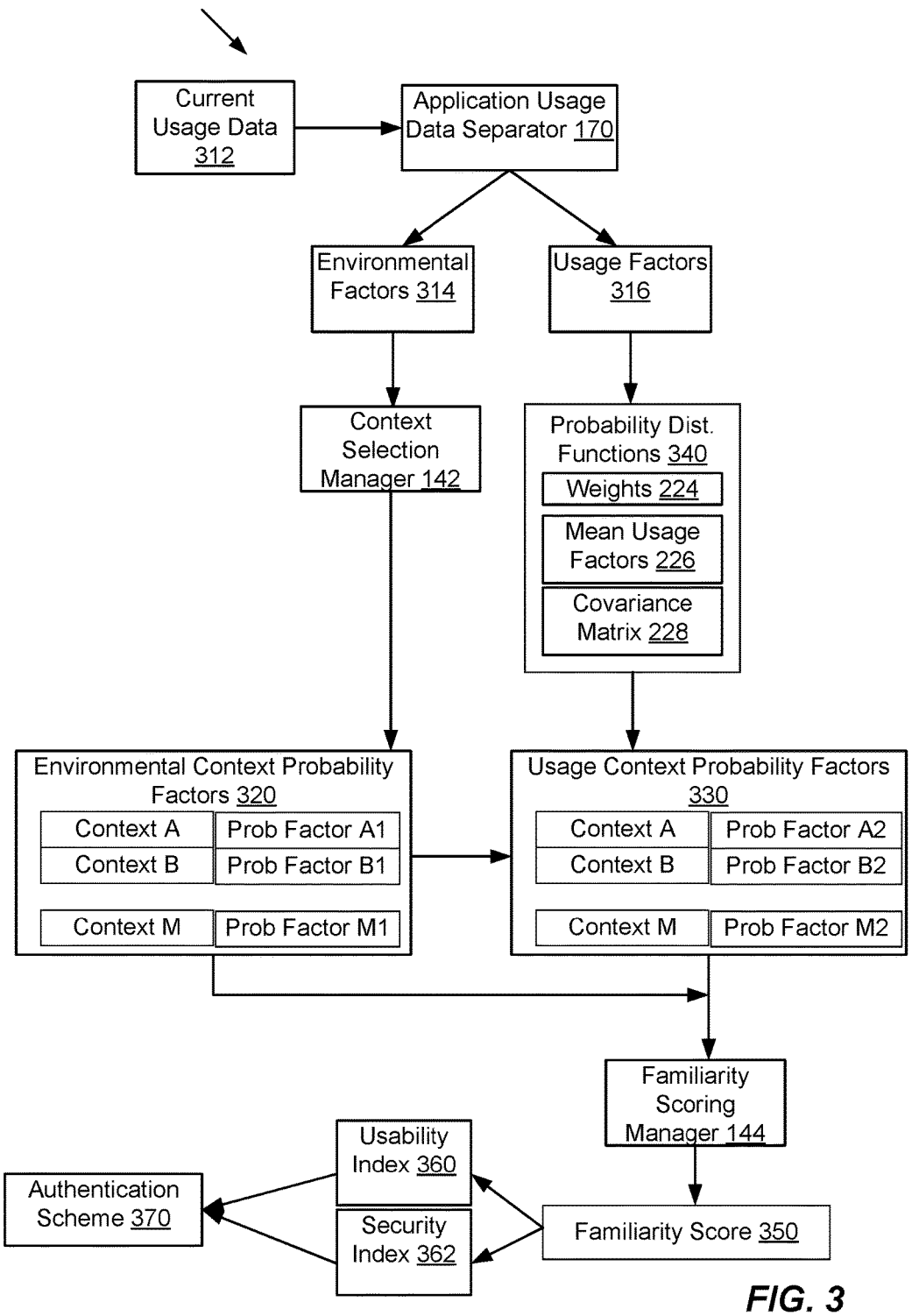
FIG. 3 is a flow chart illustrating an example application of a model to the determination of an authentication scheme within the electronic environment shown in FIG. 1.

FIG. 3 illustrates an example model application manager 140. At this point, the first, training phase has completed and a second, operational phase has commenced. As shown in FIG. 3, after the model generation manager 130 has created the environmental contexts 134 and generated the probability distribution functions (defined by the widths 224, means 226, and covariance matrix 228), the access control server 120 receives current usage data 312. In this operational phase, the access control server 120 selects an authentication scheme 370 based on the current usage data 312.

Again, the application usage data separator 170 produces the environmental factors 314 and the usage factors 316 from the current usage data 312. From the environmental factors 314, the context selection manager 142 produces environmental context probability factors 320 for each of the contexts 134 (i.e., Probability Factor A1 for Context A, Probability Factor B1 for Context B, and so on). Each of the environmental context probability factors 320 represents the probability $\Pr(C_j | Y_1 = y_1, Y_2 = y_2, \ldots, Y_m = y_m) = \Pr(C_j | y)$ of that corresponding context $C_j$ occurring given the environmental factors 314 taken from the current usage data 312.

In addition, the familiarity scoring manager 144 uses the previously derived probability distribution functions 340 that contain the weights 224, mean usage factors 226, and covariance matrices 228 (i.e., parameters $\pi_k$, $\mu_k$, and $\Sigma_k k \in \{1, 2, \ldots, K_j\}$ for each context $C_j$) to compute usage context probability factors 330 for that context $C_j$ (i.e., Probability Factor A2 for Context A, Probability Factor B2 for Context B, and so on). Each of the usage context probability factors 330 represents that probability $\Pr(X_1 = x_1, X_2 = x_2, \ldots, X_d = x_d | C_j) = p(x | C_j)$ of the usage factors taking on the values $x_1, x_2, \ldots, x_d$ from the usage factors 316 given the context $C_j$.

In some arrangements, the usage context probability factors 330 are modified to represent local familiarity scores fam(x|$C_j$) for fixed contexts 134 as follows. The familiarity scoring manager 144 first computes $$\text{Local}(x \mid C_j) = \max_{\pi_k > \gamma} N\left(x, \mu_k, \sum_k\right),$$

where γ is a parameter that indicates a minimum support for which a local mixture would be representative. The usage context probability factor 330 are then modified to take the value fam(x|$C_j$)=max{p(x|$C_j$), Local(x|$C_j$)}.

Once the environmental context probability factors 320 and the usage context probability factor 330 have been generated, the familiarity scoring manager 144 produces triples {$C_j$, Pr($C_j$|y) fam(x|$C_j$)}. For example, Table 2 lists examples of such triples over the contexts 134.

TABLE 2

| Context 134 | Environmental context probability factors 320 | Usage context probability factors 330 |
|---|---|---|
| Context A | 0.6 | 0.9 |
| Context B | 0.3 | 0.1 |
| Context C | 0.1 | 0.6 |

The familiarity scoring manager 144 produces the familiarity score 148 using the following formula:

$$\text{Familiarity Score}(x, y) = \sum_j \text{fam}(x \mid C_j) Pr(C_j \mid y)$$

For example, using the data shown in Table 2, the familiarity score 148 for the contexts shown is 0.63.

The model application manager 140 then maps the familiarity score 148 to values of the usability indices 146a and security indices 146b to select an authentication scheme 146 by which to authenticate the user 114. Thus, the model application manager 140 ultimately selects an authentication scheme 146 based on comparisons between the current usage data 312 and the expected usage data in context.

Figure 4:
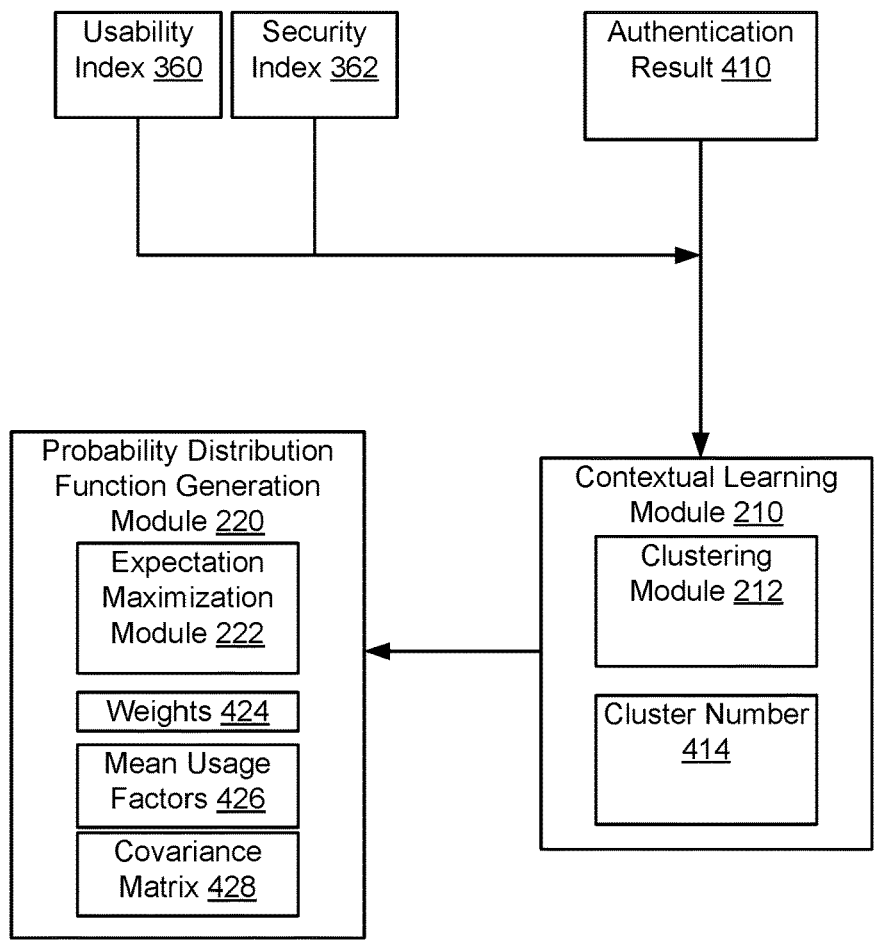
FIG. 4 is a flow chart illustrating an example adjustment of a model within the electronic environment shown in FIG. 1.

FIG. 4 illustrates an example model adjustment manager 150. The model adjustment manager 150 takes as input the usability indices 146a and security indices 146b of the selected authentication scheme 146 as well as an authentication result 410 from authenticating the user 114 based on the selected authentication scheme 146. Based on this input, the model adjustment manager 150 adjusts the contexts 134 as well as the probability distributions. For example, when certain arrangements of application usage data 312 consistently result in successful authentication, then the contexts and probability distributions should be arranged so that the resulting familiarity score 148 produces either no authentication or a low-security authentication scheme 146. Conversely, when arrangements of the application usage data 312 consistently result in unsuccessful authentication, then the contexts and probability distributions should be arranged so that the resulting familiarity score 148 produces a high-security authentication scheme 146.

In example operation, the model adjustment manager 150 performs a supervised learning operation on the contexts 134 via the contextual learning module 210. The effect here is to adjust the expected environmental factors of each context based on the input. However, in some arrangements, new contexts may be created and old ones deleted based on this input. When new contexts are created or old ones deleted, the contextual learning module 210 produces a new cluster number 414.

Further, the model adjustment manager 150 performs a supervised learning operation on the on the probability distributions for each context via the probability distribution function generation module 220. The result of the supervised learning are adjusted weights 424, means 426, and covariance matrices 428.

Figure 5:
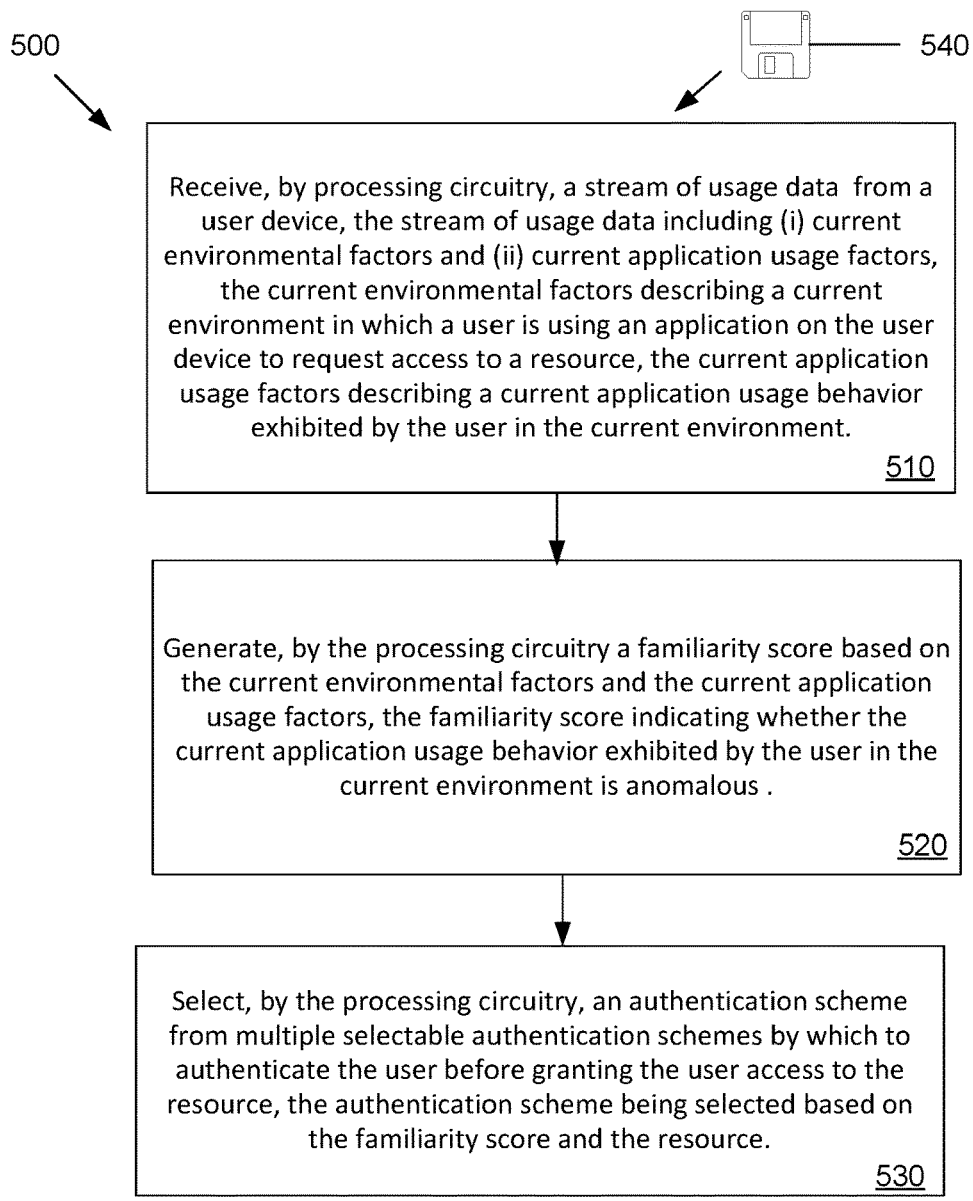
FIG. 5 is a flow chart illustrating an example method of processing the write requests within the electronic environment shown in FIG. 1.

FIG. 5 illustrates a method 500 of controlling access to a resource. The method 500 may be performed by the software constructs described in connection with FIG. 1, which reside in the memory 140 of the server computer 120 and are run by the set of processing units 124.

At 510, a stream of usage data is received from a user device. The stream of usage data includes (i) current environmental factors describing a current environment in which a user is using an application on the user device to request access to a resource and (ii) current application usage factors describing a current application usage behavior exhibited by the user in the current environment.

At 520, a familiarity score based on the current environmental factors and the current application usage factors is generated, the familiarity score indicating whether the current application usage behavior exhibited by the user in the current environment is anomalous.

At 530, an authentication scheme is selected from multiple selectable authentication schemes by which to authenticate the user before granting the user access to the resource, the authentication scheme being selected based on the familiarity score and the resource.

Improved techniques have been described for controlling access to a resource. Such techniques involve outputting a decision indicating whether to authenticate a user based on a user's application usage behavior in a particular environmental context. Advantageously, the improved techniques reduce the burden of too-frequent authentication on a user who requires access to a resource while improving security.

Having described certain embodiments, numerous alternate embodiments or variations can be made. For example, the probability distributions described herein have been normal distributions. However, other distributions such as Bernoulli distributions may be used instead.

One should appreciate that the above-described techniques do not merely compute a familiarity score in order to control access to data. Rather, the disclosed techniques involve an improvement to an industrial process, namely securing electronic resources in a machine.

In some arrangements, the access control server 120 is implemented by a set of cores or other types of control/processing circuitry running software. In such arrangements, the software instructions can be delivered, within the access control server 120, in the form of a computer program product 540. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of selecting an authentication scheme to control an access to a resource, the method comprising:
   receiving, by processing circuitry, a stream of usage data from a user device, the stream of usage data including (i) current environmental factors, and (ii) current application usage factors pertaining to a use of an application by a user, the current environmental factors describing a current environment in which the user uses the application running on the user device to request the access to the resource, the current application usage factors describing a current application usage behavior exhibited by the user while using the application in the current environment;
   generating, by the processing circuitry, a familiarity score based on the current environmental factors and the current application usage factors, the familiarity score indicating whether the current application usage behavior exhibited by the user in the current environment is anomalous; and
   selecting, by the processing circuitry, an authentication scheme from multiple selectable authentication schemes by which to authenticate the user before granting the user the access to the resource, the authentication scheme being selected based on the familiarity score and the resource being accessed.

2. The method as in claim 1, wherein generating the familiarity score includes:
   performing, by the processing circuitry for each of multiple environmental contexts associated with the user, a comparison operation that compares (i) the current environmental factors of the stream of usage data to expected environmental factors of that predefined environmental context and (ii) the current application usage factors of the stream of usage data to expected application usage factors pertaining to the use of the application by the user of that predefined environmental context, the comparison operation producing a comparison result for that environmental context indicating a measure of closeness between the current environmental factors and expected environmental factors of that environmental context, the familiarity score being based on the comparison result.

3. The method as in claim 2, further comprising, prior to receiving the usage data:
   collecting sets of training data, each of the sets of training data including environmental factors for the user in an environment and usage factors describing usage behavior exhibited by the user in the environment;
   forming the multiple predefined environmental contexts associated with the user from the environmental factors of the collected sets of training data; and
   forming the expected application usage behavior in each of the multiple predefined environmental contexts associated with the user from the usage factors of the collected sets of training data and the environmental factors of that predefined environmental context.

4. The method as in claim 3, wherein each of the multiple authentication schemes is defined by (i) a usability index indicating a level of accessibility of that authentication scheme for the user and (ii) a security index indicating a level of confidence that a successful authentication of the user according to that authentication scheme implies that the user is genuine;
   wherein the method further comprises, after generating the familiarity score, (i) mapping the familiarity score and a resource identifier identifying the resource to a usability index and a security index and (ii) based on the usability index and security index mapped from the familiarity score and the resource identifier, selecting an authentication scheme from the multiple authentication schemes.

5. The method as in claim 4, further comprising, after selecting the authentication scheme from the multiple authentication schemes:
   receiving a result of an authentication operation on the user using the selected authentication scheme;
   collecting (i) the usage data, (ii) the usability index and security index of the selected authentication scheme, and (iii) the result of the authentication operation on the user; and
   for each of the multiple predefined environmental contexts, adjusting (i) the expected environmental factors of that predefined environmental context and (ii) the expected application usage behavior in that predefined environmental context based on the collected usage data, the usability index and security index of the selected authentication scheme, and the result of the authentication operation on the user.

6. The method as in claim 4, wherein an authentication scheme of the multiple authentication schemes are selected from a list of authentication schemes, the list including (i) not authenticating the user, (ii) comparing a fingerprint taken from a fingerprint reader with an image of the user's fingerprint stored in a database, (iii) comparing a received password with a password stored in the database, (iv) comparing digits generated by a hardware token with digits generated synchronously by a token server, and a combination of (iii) and (iv).

7. The method as in claim 3, wherein performing the comparison operation includes generating, as a comparison result for an environmental context associated with the user, (i) a first probability factor indicating a probability that the current environmental factors describe the predefined environmental context and (ii) a second probability factor indicating a probability that the current usage factors describe the expected application usage behavior in the predefined environmental context.

8. The method as in claim 7, wherein generating the familiarity score includes:
   for each of the multiple predefined environmental contexts, forming a product of the first probability factor and the second probability factor for that predefined environmental contexts; and
   summing each product for each of the multiple predefined environmental contexts to produce the familiarity score.

9. The method as in claim 7, wherein forming the expected application usage behavior in each of the multiple predefined environmental contexts includes producing a probability distribution function of usage factors for that predefined environmental context based on the usage factors of the collected sets of training data and the environmental factors of that predefined environmental context; and
   wherein generating the second probability factor for the predefined environmental context includes evaluating the probability distribution function for the predefined environmental context.

10. The method as in claim 9, generating the second probability factor for the predefined environmental context further includes:
   computing a maximum value over the probability distribution function for the predefined environmental context to produce a local maximum; and
   computing, as the second probability factor, the greater of the probability distribution function for the predefined environmental context and the local maximum.

11. The method as in claim 2, wherein each of the current environmental factors and the expected environmental factors are considered from a list of environmental factors, the list including (i) a time of a day, (ii) a location of the user device, (iii) a WiFi signal strength, (iv) a Bluetooth signal strength, (v) a temperature, and (vi) an ambient light level.

12. The method as in claim 2, wherein each of the current application usage factors and the expected application usage factors are considered from a list of application usage factors pertaining to the use of the application by the user, the list including (i) a duration of a current session of the use of the application by the user, (ii) a first number of sessions of the use of the application by the user over a previous amount of time, (iii) a second number of applications running on the user device during the current session of the use of the application by the user, and (vi) a motion of the user device during the current session of the use of the application by the user.

13. The method as in claim 1, wherein the receiving of the stream of usage data from the user device includes receiving the usage data pertaining to the current application usage factors, wherein the current application usage factors include one or more of (i) a duration of a current session of the use of the application by the user, and (ii) a number of sessions of the use of the application by the user over a predetermined period of time.

14. A computer program product including a non-transitory, computer-readable storage medium which stores executable code, which when executed by a computer, causes the computer to perform a method comprising:
   receiving a stream of usage data from a user device, the stream of usage data including (i) current environmental factors, and (ii) current application usage factors pertaining to a use of an application by a user, the current environmental factors describing a current environment in which the user uses the application running on the user device to request an access to a resource, the current application usage factors describing a current application usage behavior exhibited by the user while using the application in the current environment;
   generating a familiarity score based on the current environmental factors and the current application usage factors, the familiarity score indicating whether the current application usage behavior exhibited by the user in the current environment is anomalous; and
   selecting an authentication scheme from multiple selectable authentication schemes by which to authenticate the user before granting the user the access to the resource, the authentication scheme being selected based on the familiarity score and the resource.

15. The computer program product as in claim 14, wherein generating the familiarity score includes performing, by the processing circuitry for each of multiple environmental contexts associated with the user, a comparison operation that compares (i) the current environmental factors of the stream of usage data to expected environmental factors of that predefined environmental context and (ii) the current application usage factors of the stream of usage data to expected application usage factors pertaining to the use of the application by the user of that predefined environmental context, the comparison operation producing a comparison result for that environmental context indicating a measure of closeness between the current environmental factors and expected environmental factors that environmental context, the familiarity score being based on the comparison result.

16. The computer program product as in claim 15, wherein the method further comprises, prior to receiving the usage data:
   collecting sets of training data, each of the sets of training data including environmental factors for the user in an environment and usage factors describing usage behavior exhibited by the user in the environment;
   forming the multiple predefined environmental contexts associated with the user from the environmental factors of the collected sets of training data; and
   forming the expected application usage behavior in each of the multiple predefined environmental contexts associated with the user from the usage factors of the collected sets of training data and the environmental factors of that predefined environmental context.

17. The computer program product as in claim 16, wherein each of the multiple authentication schemes is defined by (i) a usability index indicating a level of accessibility of that authentication scheme for the user and (ii) a security index indicating a level of confidence that a successful authentication of the user according to that authentication scheme implies that the user is genuine;
   wherein the method further comprises, after generating the familiarity score, (i) mapping the familiarity score and a resource identifier identifying the resource to a usability index and a security index and (ii) based on the usability index and security index mapped from the familiarity score and the resource identifier, selecting an authentication scheme from the multiple authentication schemes.

18. The computer program product as in claim 17, wherein the method further comprises, after selecting the authentication scheme from the multiple authentication schemes:
   receiving a result of an authentication operation on the user using the selected authentication scheme;
   collecting (i) the usage data, (ii) the usability index and security index of the selected authentication scheme, and (iii) the result of the authentication operation on the user; and
   for each of the multiple predefined environmental contexts, adjusting (i) the expected environmental factors of that predefined environmental context and (ii) the expected application usage behavior in that predefined environmental context based on the collected usage data, the usability index and security index of the selected authentication scheme, and the result of the authentication operation on the user.

19. The computer program product as in claim 16, wherein performing the comparison operation includes generating, as a comparison result for an environmental context associated with the user, (i) a first probability factor indicating a probability that the current environmental factors describe the predefined environmental context and (ii) a second probability factor indicating a probability that the current usage factors describe the expected application usage behavior in the predefined environmental context.

20. The computer program product as in claim 19, wherein generating the familiarity score includes:

for each of the multiple predefined environmental contexts, forming a product of the first probability factor and the second probability factor for that predefined environmental contexts; and summing each product for each of the multiple predefined environmental contexts to produce the familiarity score.

21. An electronic apparatus comprising memory and controlling circuitry coupled to the memory, the controlling circuitry being constructed and arranged to:

receive a stream of usage data from a user device, the stream of usage data including (i) current environmental factors, and (ii) current application usage factors pertaining to a use of an application by a user, the current environmental factors describing a current environment in which the user uses the application running on the user device to request an access to a resource, the current application usage factors describing a current application usage behavior exhibited by the user while using the application in the current environment;

generate a familiarity score based on the current environmental factors and the current application usage factors, the familiarity score indicating whether the current application usage behavior exhibited by the user in the current environment is anomalous; and select an authentication scheme from multiple selectable authentication schemes by which to authenticate the user before granting the user the access to the resource, the authentication scheme being selected based on the familiarity score and the resource.

* * * * *